(12) United States Patent
Murotani et al.

(10) Patent No.: US 10,584,655 B2
(45) Date of Patent: Mar. 10, 2020

(54) ENGINE EXHAUST DEVICE

(71) Applicant: MAZDA MOTOR CORPORATION, Hiroshima (JP)

(72) Inventors: Mitsuyuki Murotani, Hiroshima (JP); Takafumi Nishio, Otake (JP); Shuhei Tsujita, Hatsukaichi (JP); Einosuke Suekuni, Higashihiroshima (JP); Junji Umemura, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 99 days.

(21) Appl. No.: 15/763,740

(22) PCT Filed: Mar. 8, 2017

(86) PCT No.: PCT/JP2017/009286
§ 371 (c)(1),
(2) Date: Mar. 27, 2018

(87) PCT Pub. No.: WO2017/154988
PCT Pub. Date: Sep. 14, 2017

(65) Prior Publication Data
US 2018/0283303 A1    Oct. 4, 2018

(30) Foreign Application Priority Data
Mar. 11, 2016   (JP) ................... 2016-048996

(51) Int. Cl.
*F02D 41/12*    (2006.01)
*F02B 37/02*    (2006.01)
(Continued)

(52) U.S. Cl.
CPC ............ *F02D 41/123* (2013.01); *F02B 37/02* (2013.01); *F02B 37/025* (2013.01); *F02B 37/18* (2013.01);
(Continued)

(58) Field of Classification Search
CPC .... F02D 41/123; F02D 41/126; F02D 41/047; F02D 41/0007; F02D 2009/0245; F02B 37/02; F02B 37/025; F02B 37/22
See application file for complete search history.

(56) References Cited

U.S. PATENT DOCUMENTS

2002/0174648 A1* 11/2002 Minami .................. F01N 3/023
60/295
2010/0250103 A1   9/2010 Shimo et al.
2015/0315986 A1   11/2015 Minami

FOREIGN PATENT DOCUMENTS

JP    S61-038124 A    2/1986
JP    S61-043220 A    3/1986
(Continued)

OTHER PUBLICATIONS

International Search Report issued in PCT/JP2017/009286; dated May 16, 2017.

*Primary Examiner* — Mark A Lauenzi
*Assistant Examiner* — Jessica L Kebea
(74) *Attorney, Agent, or Firm* — Studebaker & Brackett PC

(57) ABSTRACT

An exhaust passage 53 includes: a first passage (high-speed passages 24*b*, 25*b*, and 26*b*); and a second passage (low-speed passages 24*c*, 25*c*, and 26*c*). A turbine housing 560 is connected to the exhaust passage 53 downstream from the collector 54. An exhaust device 100 of an engine 1 includes a valve (an exhaust variable valve 3) to open and close the first passage. A controller (an engine controller 7) closes the valve if an engine speed of the engine 1 is lower than a predetermined engine speed and opens the valve if the engine speed of the engine 1 is higher than or equal to the predetermined engine speed. The controller opens the valve (Continued)

even though the engine speed of the engine 1 is lower than the predetermined engine speed if performing the fuel cut control.

3 Claims, 10 Drawing Sheets

(51) Int. Cl.
*F02B 37/18* (2006.01)
*F02B 37/22* (2006.01)
*F02D 41/00* (2006.01)
*F02D 43/00* (2006.01)

(52) U.S. Cl.
CPC .......... *F02B 37/22* (2013.01); *F02D 41/0002* (2013.01); *F02D 41/0007* (2013.01); *F02D 41/12* (2013.01); *F02D 43/00* (2013.01); *F02D 2200/101* (2013.01); *F02D 2200/1002* (2013.01); *F02D 2200/1004* (2013.01); *F02D 2200/602* (2013.01); *F02D 2250/34* (2013.01); *Y02T 10/144* (2013.01); *Y02T 10/42* (2013.01)

(56) References Cited

FOREIGN PATENT DOCUMENTS

| | | |
|---|---|---|
| JP | H10-030477 A | 2/1998 |
| JP | 2010-229923 A | 10/2010 |
| JP | 2014-080900 A | 5/2014 |
| JP | 2014-109199 A | 6/2014 |
| WO | WO-2008114730 A1 * | 9/2008 ........... F01N 3/0814 |

* cited by examiner

ENGINE EXHAUST DEVICE

TECHNICAL FIELD

The present disclosure relates to an engine exhaust device.

BACKGROUND ART

PATENT DOCUMENT 1 describes an exhaust valve device for a turbo charged engine. The exhaust valve device is provided between a turbine and an independent exhaust passage communicating with each of cylinders. Depending on an engine speed, the exhaust valve device changes a flow area of exhaust gas discharged from the engine to change a flow rate of the exhaust gas to be introduced into the turbine.

Further detailed below is the exhaust device described in PATENT DOCUMENT 1. This engine is an inline-four engine having four cylinders including first to fourth cylinders. The independent exhaust passage includes a first exhaust passage communicating with the first cylinder, a second exhaust passage communicating with the second and third cylinders, and a third exhaust passage communicating with the fourth cylinder. The exhaust valve device includes an upstream exhaust passage connected to the independent exhaust passage. A turbocharger includes a downstream exhaust passage connecting the upstream exhaust passage to a turbine housing.

The upstream exhaust passage includes three independent passages each communicating with a corresponding one of the first to third exhaust passages. Each of the three passages branches into two passages; namely, a high-speed passage and a low-speed passage. The downstream exhaust passage includes (i) independent low-speed passages communicating with respective low-speed passages of the upstream exhaust passage and (ii) independent high-speed passages communicating with respective high-speed passages of the upstream exhaust passage. Three independent low-speed passages of the upstream exhaust passage join the low-speed passages of the downstream exhaust passage, and three independent high-speed passages in the upstream exhaust passage join the high-speed passages of the downstream exhaust passage. The downstream exhaust passage has a downstream end at which the low-speed passages and the high-speed passages join together. The join of the downstream end is connected to an inlet of the turbine.

A high-speed passage of the upstream exhaust passage is provided with a butterfly valve. The butterfly valve switches between an open position and a closed position when a drive shaft connected to the butterfly valve is rotated by an actuator.

When the engine runs in a low speed range; that is, the engine runs at a predetermined speed or lower, the butterfly valve closes. The closed butterfly valve narrows down the flow area of the exhaust gas, raising the flow rate of the exhaust gas and increasing driving force of the turbine in the low speed range of the engine. Moreover, the increase in the flow rate of the exhaust gas creates an ejector effect at the join of the three independent passages for low speed passages. In the low speed range, the increase in the flow rate also creates an effect to suck burned gas out of a cylinder. Meanwhile, in the high speed range of the engine, the exhaust gas can be introduced into the turbine through both the low-speed passages and the high-speed passages, reducing exhaust backpressure and increasing driving force of the turbine.

PATENT DOCUMENT 2 describes that fuel is cut if a predetermined fuel cut condition is met while the car is slowing down, so that the fuel efficiency of the car improves.

CITATION LIST

Patent Documents

PATENT DOCUMENT 1: Japanese Unexamined Patent Publication No. 2014-80900
PATENT DOCUMENT 2: Japanese Unexamined Patent Publication No. H10-30477

SUMMARY OF THE INVENTION

Technical Problem

When the engine equipped with the exhaust device disclosed in PATENT DOCUMENT 1 is combined with the fuel cut control disclosed in PATENT DOCUMENT 2, the butterfly valve closes to close a high-speed passage when the engine speed falls to a predetermined engine speed or below during the fuel cut.

Here, during the fuel cut, an opening of a throttle valve is small and the fuel does not combust in a combustion chamber. Hence, when the expansion stroke without combustion ends, a pressure in a cylinder is lower than that in an intake passage and an exhaust passage. Thus, when an exhaust valve opens in an initial stage of the exhaust stroke, the gas in the exhaust passage flows back into the cylinder. Meanwhile, as the exhaust stroke proceeds and the piston rises, the gas in the cylinder is forced out toward the exhaust passage. The butterfly valve closing the high-speed passage alternately receives a fluid pressure created when the gas in the exhaust passage flows back into the cylinder and a fluid pressure created when the gas in the cylinder is forced out toward the exhaust passage. As a result, the butterfly valve pivots about the drive shaft and flip-flops. This is a potential cause of noise and reduction in durability of the butterfly valve.

The present disclosure relates to an engine exhaust device including an exhaust passage in which a valve is provided. In view of the forgoing background, it is an object of the present disclosure to reduce flip-flop of the valve during a fuel cut.

Solution to the Problem

The present disclose relates to an engine exhaust device including: a valve shaped into a plate and provided in an exhaust passage connecting an exhaust opening of a combustion chamber within an engine to a catalytic device outside the engine, the valve being pivotable to change a cross-sectional area of the exhaust passage when a drive shaft pivots; and a valve controller controlling an opening of the valve.

The engine includes: a fuel injection valve supplying the combustion chamber with fuel, and a fuel injection valve controller performing a fuel cut control which involves keeping the fuel from being injected from the fuel injection valve if a predetermined condition is met while a car is running, the exhaust passage includes: a common passage connected to the exhaust opening; a first passage and a second passage branching off downstream in the common passage and provided in parallel with each other; and a collector, provided downstream of the first passage and the second passage, in which the first passage and the second passage join together, the collector of the first passage and the second passage is connected to a turbine housing of a turbocharger including a turbine, the valve is provided in the first passage to change a cross-sectional area of the first passage, the valve controller (i) closes the valve to close the first passage if an engine speed of the engine is lower than a predetermined engine speed, and (ii) opens the valve to open the first passage if the engine speed of the engine is higher than or equal to the predetermined engine speed, and the valve controller opens the valve even though the engine speed of the engine is lower than the predetermined engine speed if the fuel injection valve controller performs the fuel cut control.

In this configuration, the valve provided in the first passage of the exhaust passage closes if the engine speed of the engine is lower than the predetermined engine speed. Thus, the valve closes the first passage. The closed butterfly valve narrows down the flow area of the exhaust gas, raising the flow rate of the exhaust gas and increasing driving force of the turbine in the low speed range of the engine. In addition, the valve opens if the engine speed of the engine is higher than or equal to the predetermined engine speed. Thus, the valve opens the first passage. The valve may be fully open. Alternatively, the valve may be adjusted to be half open. Such features make it possible to introduce the exhaust gas into the turbine through both the first passage and the second passage, reducing exhaust backpressure and increasing driving force of the turbine.

Then, when the fuel injection valve controller performs the fuel cut control, the valve controller opens the valve to open the first passage even though the engine speed of the engine is lower than the predetermined engine speed. Here, the valve may be fully open. Alternatively, the valve may be adjusted to be half open. Such features reduce the risk that the fluid pressure acts on the valve, even if the gas in the exhaust passage flows back into the cylinder and the gas in the cylinder is forced out toward the exhaust passage with the opening and closing of the exhaust valve. As a result, flip-flop of the valve during the fuel cut can be reduced.

The engine exhaust device may further include: an accelerator angle detector detecting an accelerator angle; and a torque estimator estimating an actual torque of the engine, wherein the valve controller may open the valve even though the engine speed of the engine is lower than the predetermined engine speed if the accelerator angle detector detects that the accelerator angle is zero and the torque estimator estimates that the actual torque of the engine is lower than or equal to a predetermined value.

Specifically, the valve controller opens the valve simultaneously when the fuel cut starts, not after the fuel cut has started. Thus, the valve controller opens the valve when the accelerator angle is detected to be zero and the actual torque of the engine is detected to be lower than or equal to a predetermined value. Such features make it possible to immediately open the closed valve simultaneously when the fuel cut starts. As a result, the flip-flop of the valve can be reliably reduced, reducing generation of noise.

The controller may open the valve if the accelerator angle detector detects a state in which the accelerator angle is continuously zero for a predetermined time period.

The valve controller does not immediately open the valve when the accelerator angle becomes temporarily zero. Instead, the valve controller opens the valve when the state in which the accelerator angle is zero continues. Such a feature keeps the valve provided in the exhaust passage from opening when the driver releases the accelerator pedal for a moment and then seen depresses the pedal again. As a result, the driver can run the car smoothly.

Advantages of the Invention

As described above, the engine exhaust device includes a valve to close when the engine speed of the engine is lower than the predetermined engine speed. When the fuel cut control is performed, the engine exhaust device opens the valve to open the first passage even though the engine speed of the engine is lower than the predetermined engine speed. Such a feature reduces the risk that the fluid pressure acts on the valve with the opening and closing of the exhaust valve during the fuel cut, contributing to reducing flip-flop of the valve during the fuel cut.

DESCRIPTION OF EMBODIMENTS

Figure 1:
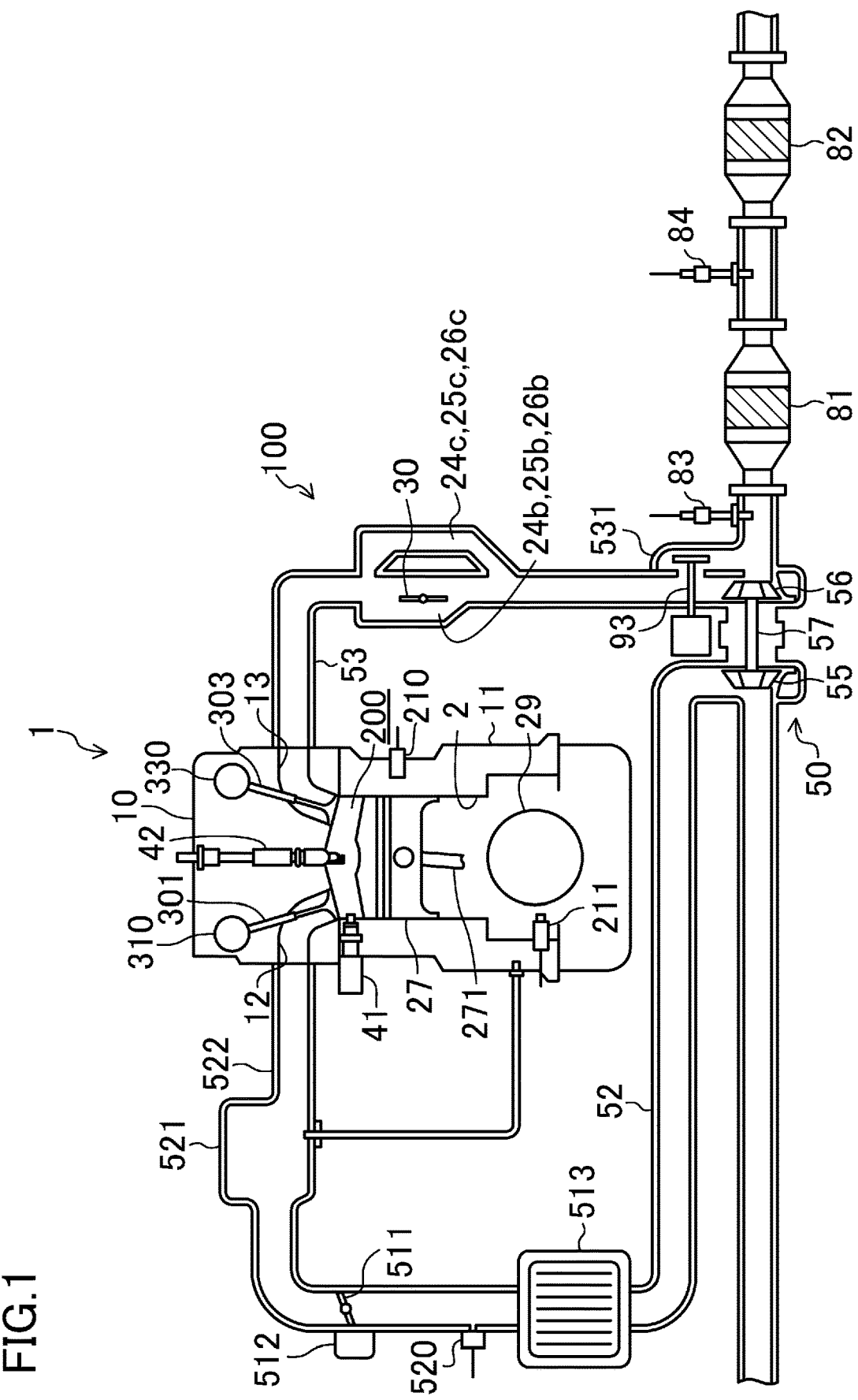
FIG. 1 is a conceptual diagram illustrating an engine system to which an engine exhaust device is applied.

Described below in detail is an engine exhaust device disclosed with reference to the drawings. Note that the description below is an example. FIG. 1 illustrates an engine system to which the exhaust device 100 is applied.

(General Configuration of Engine System)

The engine system includes an engine 1; namely, a spark-ignited internal combustion engine. The engine 1 is a turbocharged engine. The engine 1 is mounted so-called transversely (not shown) in the engine compartment located in the front of a car. The engine 1 may also be mounted longitudinally. The engine 1 includes a crankshaft 29 as an output shaft connected to driving wheels via a not-shown transmission. The output from the engine 1 is transmitted to the driving wheels to run the car.

The engine 1 includes a cylinder block 11 and a cylinder head 10 placed above the cylinder block 11. The cylinder block 11 contains multiple cylinders 2. In this example, as described later, the engine 1 includes first to fourth cylinders; namely cylinders 2A to 2D. The four cylinders 2 are arranged perpendicularly to the drawing plane of FIG. 1.

Note that the number and arrangement of the cylinders 2 included in the engine 1 shall not be limited to a particular number and arrangement.

The crankshaft 29 is connected to a piston 27 via a connecting rod 271 an illustration of which is partially omitted. The engine 1 includes a crank angle sensor 211 detecting a rotation speed of the crankshaft 29; namely, an engine speed of the engine 1.

The piston 27 is reciprocably inserted into each cylinder 2. The piston 27, the cylinder head 10, and the cylinder 2 define a combustion chamber 200.

The cylinder head 10 has an intake port 12 for each cylinder 2. The intake port 12 communicates with the combustion chamber 200. The intake port 12 is provided with an intake valve 301 capable of blocking an intake opening formed on the combustion chamber 200. The intake valve 301 is driven by an intake valve train mechanism 310. The intake valve 301 opens and closes the intake port 12 with predetermined timing.

The cylinder head 10 also has an exhaust port 13 for each cylinder 2. The exhaust port 13 communicates with the combustion chamber 200. The exhaust port 13 is provided with an exhaust valve 303 capable of blocking an exhaust opening formed on the combustion chamber 200. The exhaust valve 303 is driven by an exhaust valve train mechanism 330. The exhaust valve 303 opens and closes the exhaust port 13 with predetermined timing.

Figure 7:
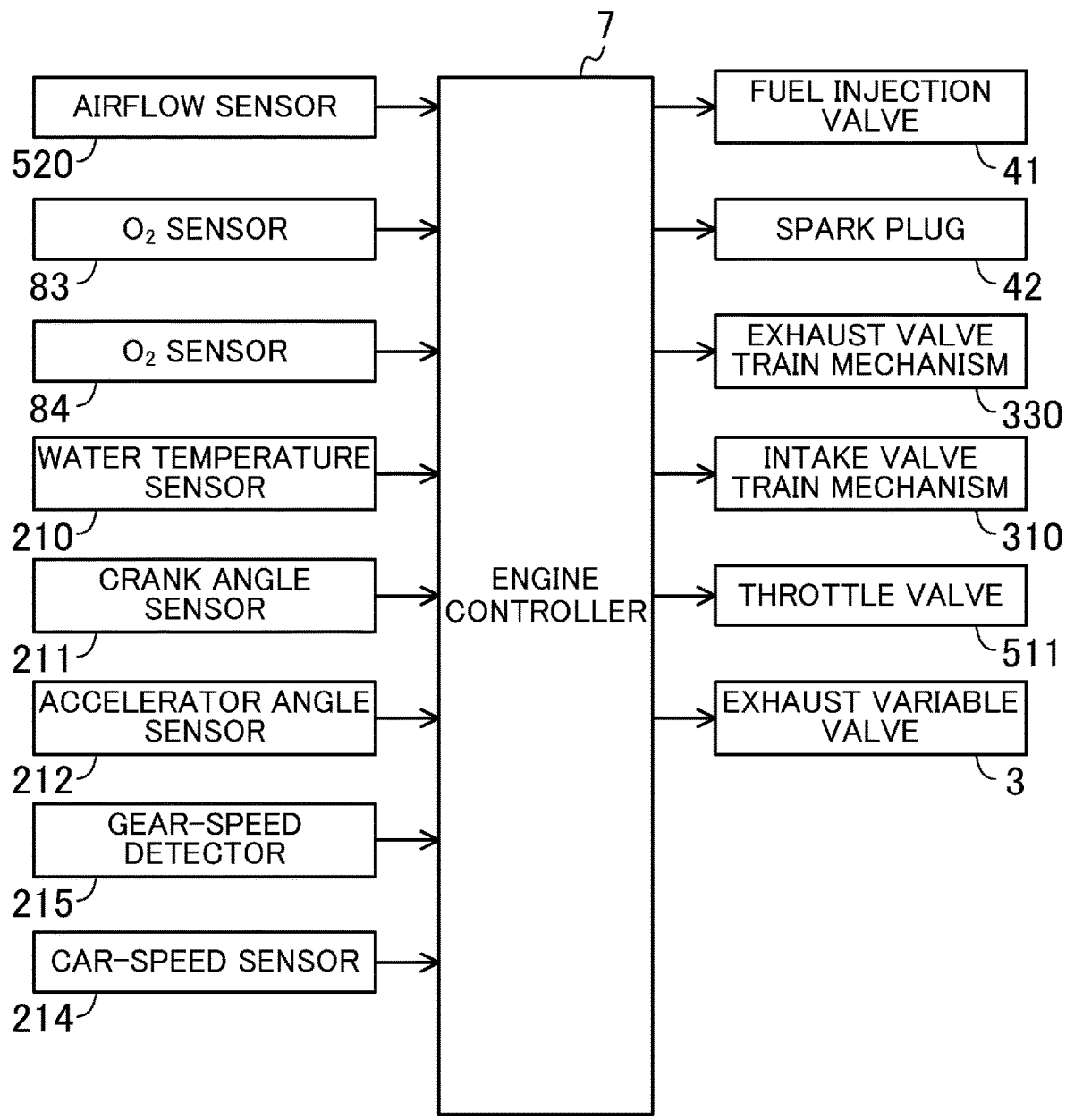
FIG. 7 is a block diagram illustrating a configuration of the engine system.

The intake valve train mechanism 310 can vary a lift amount and an opening period of the intake valve 301. The intake valve train mechanism 310 can be designed in various well-known configurations. As illustrated in FIG. 7, the intake valve train mechanism 310 varies the lift amount and the opening period of the intake valve 301 upon reception of a signal from an engine controller 7.

The exhaust valve train mechanism 330 can also vary a lift amount and an opening period of the exhaust valve 303. The exhaust valve train mechanism 330 can be designed in various well-known configurations. As illustrated in FIG. 7, the exhaust valve train mechanism 330 varies the lift amount and the opening period of the exhaust valve 303 upon reception of a signal from the engine controller 7.

The intake port 12 is connected to an intake passage 52. The intake passage 52 guides intake air into the cylinder 2. The intake passage 52 has a throttle valve 511 provided therein. The throttle valve 511 is controlled by electricity. Receiving a control signal output from the engine controller 7, a throttle actuator 512 adjusts an opening of the throttle valve 511.

A compressor 55 for a turbocharger 50 is provided upstream in the intake passage 52 from the throttle valve 511. The compressor 55 operates to supercharge the engine 1 with extra intake air. Between the throttle valve 511 and the compressor 55, an intercooler 513 is provided to cool the air compressed by the compressor 55.

A surge tank 521 and an independent passage 522 are provided downstream in the intake passage 52 from the throttle valve 511. The independent passage 522 branches downstream of the surge tank 521 into each of the four cylinders 2.

An airflow sensor 520 is provided downstream in the intake passage 52 from the compressor 55. The airflow sensor 520 detects an amount and a temperature of the intake air to be introduced into the cylinder 2.

The exhaust port 13 is connected to an exhaust passage 53. The exhaust passage 53 is provided with the exhaust device 100. The exhaust device 100 will be described later in detail.

The exhaust passage 53 is provided with a turbine 56 for the turbocharger 50. The turbocharger 50 is a part of the exhaust device 100. The turbine 56 rotates with a flow of the exhaust gas. The rotation of the turbine 56 operates the compressor 55 connected to the turbine 56 via a connecting shaft 57.

The exhaust passage 53 is provided with an exhaust bypass passage 531 for letting the exhaust gas bypass the turbine 56 and flow. The exhaust bypass passage 531 is provided with a wastegate valve 93. The wastegate valve 93 adjusts the flow rate of the exhaust gas flowing through the exhaust bypass passage 531. A larger opening of the wastegate valve 93 allows the exhaust gas to flow more through the exhaust bypass passage 531 and less through turbine 56.

A first catalytic device 81 and a second catalytic device 82 are provided downstream in the exhaust passage 53 from the turbine 56. The first and second catalytic devices 81 and 82 purify the exhaust gas. The exhaust passage 53 is also provided with two $O_2$ sensors 83 and 84 for detecting an oxygen concentration in the exhaust gas. As illustrated in FIG. 7, each of the $O_2$ sensors 83 and 84 outputs a detection signal to the engine controller 7.

A fuel injection valve 41 is secured to the engine 1 for each of the cylinders 2. The fuel injection valve 41 injects fuel (here, gasoline or a fuel containing gasoline) directly into the cylinder 2. The fuel injection valve 41 may inject the fuel into the intake port 12. The fuel injection valve 41 may have any given configuration. An example of the fuel injection valve 41 may have multiple nozzle holes. As illustrated in FIG. 7, the fuel injection valve 41 injects a predetermined amount of fuel in the cylinder 2 with predetermined timing in accordance with a fuel injection pulse from the engine controller 7. Note that the example in FIG. 1 shows that the fuel injection valve 41 is secured to a side of the cylinder 2 toward the air inlet. The fuel injection valve 41 in the cylinder 2 is not necessarily secured in a location illustrated in FIG. 1 as an example.

A spark plug 42 is also secured to the engine 1 for each of the cylinders 2. The spark plug 42 is secured to a combustion face of the cylinder head 10, with an electrode of the spark plug 42 aligned with an axis of the cylinder 2. The spark plug 42 generates a spark in the combustion chamber 200 to ignite an air-fuel mixture in the combustion chamber 200. As illustrated in FIG. 7, the spark plug 42 generates the spark with desired ignition timing upon reception of an ignition signal from the engine controller 7.

(Configuration of Engine Exhaust Device)

Figure 2:
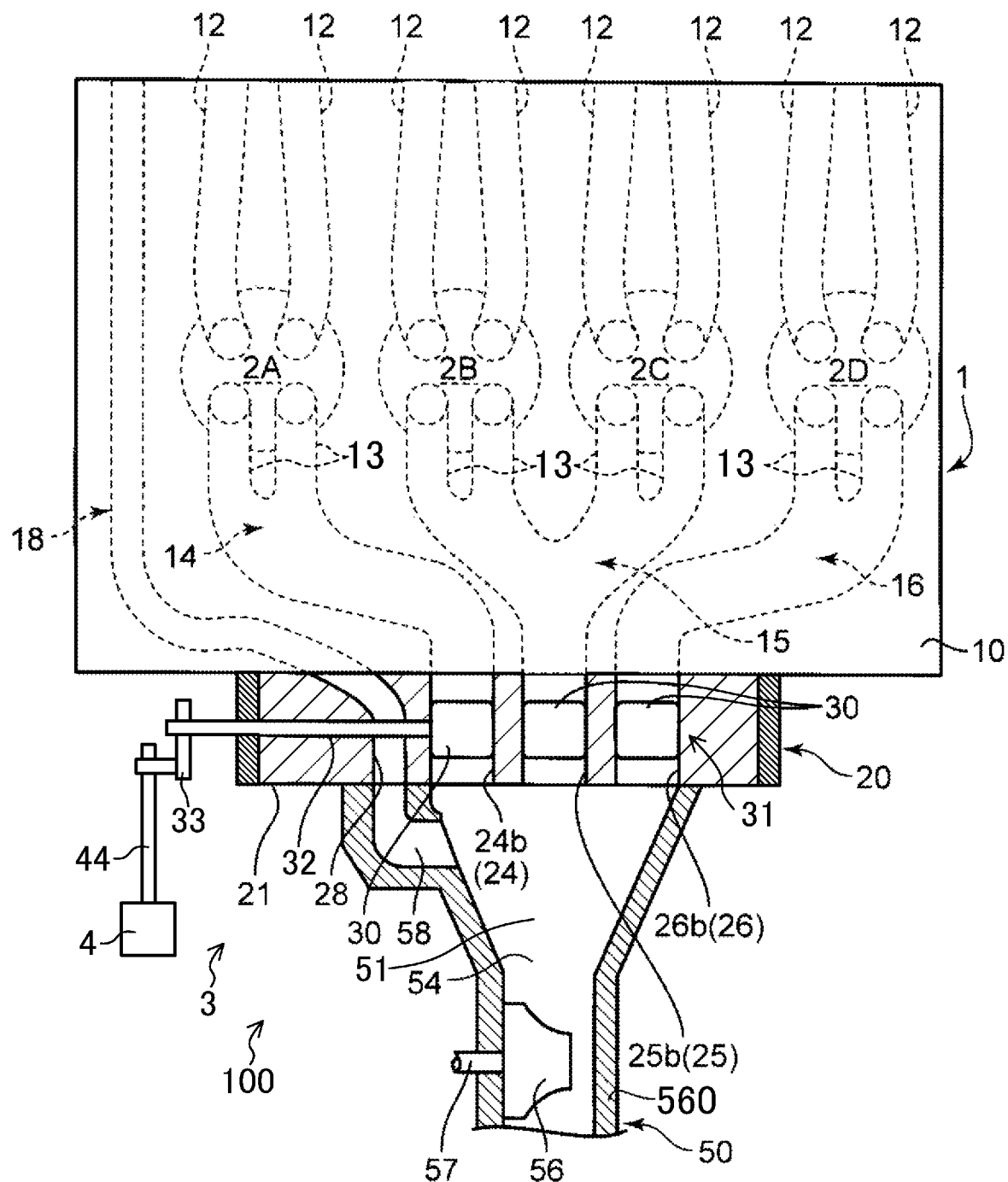
FIG. 2 is a partially cross-sectional schematic view illustrating a configuration of the engine exhaust device.
Figure 3:
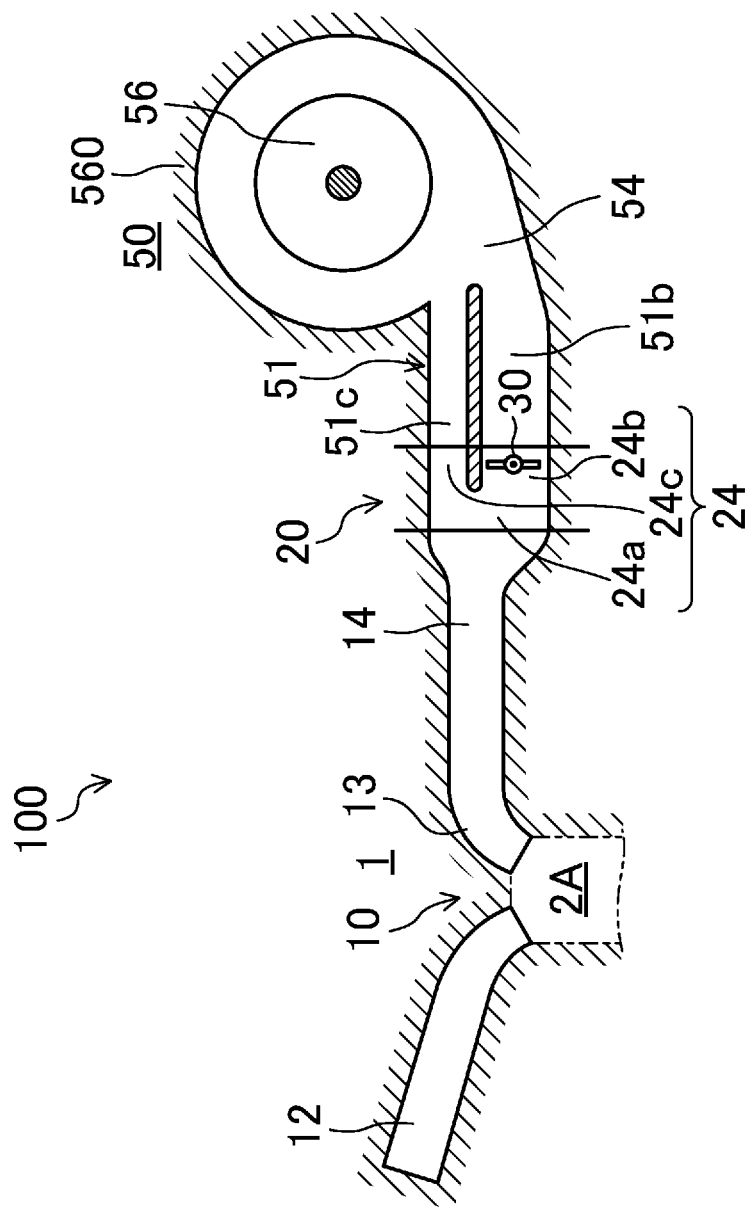
FIG. 3 is a cross-sectional view illustrating a configuration of the engine exhaust device.

FIGS. 2 and 3 illustrate the exhaust device 100 of the engine 1. As described above, the engine 1 is a four-cycle engine equipped with the turbocharger 50. In this embodiment, the cylinders fire in the order of the first cylinder, the third cylinder, the fourth cylinder, and the second cylinder. In this engine 1, the four cylinders 2A to 2D (the first cylinder 2A, the second cylinder 2B, the third cylinder 2C, and the fourth cylinder 2D) are arranged in line. The exhaust device 100 includes an exhaust manifold for discharging the exhaust gas generated in the engine 1, an exhaust valve device 20, and a turbocharger 50. The exhaust valve device 20 and the turbocharger 50 will be described later in detail.

This engine 1 does not include an independent component as the exhaust manifold. Instead, as will be described in detail later, the following constituent elements cooperate together to act as the exhaust manifold: (i) independent exhaust passages 14, 15, and 16 of the engine 1 (the cylinder head 10); (ii) upstream exhaust passages 24, 25, and 26 of the exhaust valve device 20; (iii) an exhaust introduction passage 51 of the turbocharger 50; and (□) a collector 54.

In the engine 1, the exhaust gas discharged through the exhaust manifold operates the turbocharger 50, so that the turbocharger 50 compresses the intake air to be introduced into the cylinders 2A to 2D to boost a pressure of the intake air. Then, depending on a driving state of the car, the flow rate of the exhaust gas to be introduced into the turbocharger 50 is controlled by the exhaust valve device 20 located between the engine 1 and the turbocharger 50, so that an effect of rising engine torque by this turbocharger 50 can be achieved throughout a wide range of the engine speed; that is, from the low speed range to the high speed range.

In the description below, with reference to FIG. 2, the direction in which the cylinders 2A to 2D of the engine 1 are arranged is referred to as "transverse direction", the direction perpendicular to the transverse direction (the vertical direction in FIG. 2) is referred to as "longitudinal direction", and the direction toward the turbocharger 50 is referred to as "front" of the engine 1.

The cylinder head 10 of the engine 1 has three independent exhaust passages for the four cylinders 2A to 2D. Specifically, the three independent exhaust passages include: a first independent exhaust passage 14 connected to the exhaust port 13 of the first cylinder 2A, and used for discharging the exhaust gas from the first cylinder 2A; a second independent exhaust passage 15 connected to the exhaust ports 13 each provided to a corresponding one of the second cylinder 2B and the third cylinder 2C that do not successively discharge the exhaust gas, and used in common for discharging the exhaust gas from the second cylinder 2B and the third cylinder 2C; and a third independent exhaust passage 16 connected to the exhaust port 13 of the fourth cylinder 2D, and used for discharging the exhaust gas from the fourth cylinder 2D. The second independent exhaust passage 15 branches upstream in a Y-shape. In this manner, the second independent exhaust passage 15 can be used in common with the second cylinder 2B and the third cylinder 2C.

These independent exhaust passages 14, 15, and 16 are formed to have respective downstream ends transversely collected in a generally middle of the cylinder head 10. The independent exhaust passages 14, 15, and 16 are closely aligned and transversely arranged in line, and open to a front face of the cylinder head 10.

Moreover, in the cylinder head 10, an exhaust gas recirculation (EGR) downstream passage 18 is formed. As illustrated in FIG. 2, this EGR downstream passage 18 is formed to longitudinally cross through the cylinder head 10 on the left of the first cylinder 2A. This EGR downstream passage 18 has an upstream end opening on the front face of the cylinder head 10 and on the left of the independent exhaust passage 14. Meanwhile, the EGR downstream passage 18 has a downstream end opening on a rear face of the cylinder head 10. Note that the downstream end of the EGR downstream passage 18 is open on the left of the intake port 12 for the first cylinder 2A.

Figure 4:
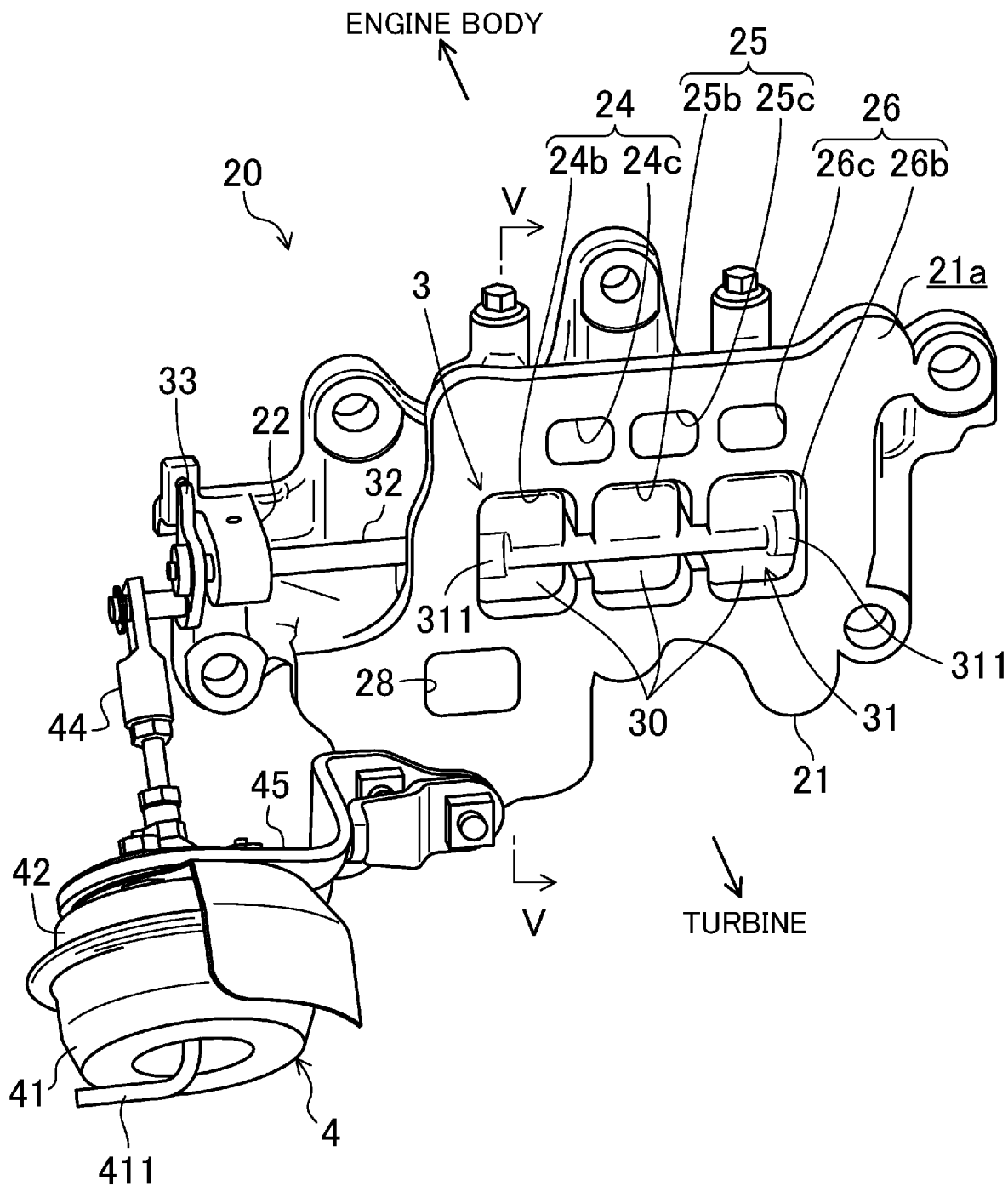
FIG. 4 is a perspective view illustrating a configuration of an exhaust valve device viewed from a turbine.

FIG. 4 is the exhaust valve device 20 observed from the turbine 56. The exhaust valve device 20 changes the flow area of the exhaust gas to be discharged from the engine 1 to change the flow rate of the exhaust gas to be introduced into the turbocharger 50. The exhaust valve device 20 is bolted to the front face of the engine 1.

This exhaust valve device 20 includes a device body 21, and an exhaust variable valve 3. The device body 21 includes: the three independent upstream exhaust passages 24, 25, and 26 (a first upstream exhaust passage 24, a second upstream exhaust passage 25, and a third upstream exhaust passage 26); and an EGR intermediate passage 28. The first upstream exhaust passage 24, the second upstream exhaust passage 25, and the third upstream exhaust passage 26 respectively communicate with the independent exhaust passage 14, the independent exhaust passage 15, and the independent exhaust passage 16 toward the cylinder head 10. The EGR intermediate passage 28 communicates with the EGR downstream passage 18 toward the cylinder head 10. The exhaust variable valve 3 is used for changing the flow area of the exhaust gas in the upstream exhaust passages 24, 25, and 26. Note that the device body 21 is a metal cast.

Each of the upstream exhaust passages 24, 25, and 26 branches downstream in a Y-shape. Specifically, as illustrated in FIGS. 3 and 4, the first upstream exhaust passage 24 includes: a common passage 24a communicating with the first independent exhaust passage 14 toward the cylinder head 10; and a high-speed passage 24b and a low-speed passage 24c vertically branching off in a two-pronged form from this common passage 24a. The second upstream exhaust passage 25 includes: a common passage 25a (not shown) communicating with the second independent exhaust passage 15 toward the cylinder head 10; and a high-speed passage 25b and a low-speed passage 25c vertically branching off in a two-pronged form from this common passage 25a. The third upstream exhaust passage 26 includes: a common passage 26a (not shown) communicating with the third independent exhaust passage 16 toward the cylinder head 10; and a high-speed passage 26b and a low-speed passage 26c vertically branching off in a two-pronged form from this common passage 26a. In this embodiment, of the upstream exhaust passages 24, 25, and 26, the high-speed passages 24b, 25b, and 26b correspond to first passages, and the low-speed passages 24c, 25c, and 26c correspond to second passages. The low-speed passages 24c, 25c, and 26c are formed smaller in cross-sectional area of a flow passage than the high-speed passages 24b, 25b, and 26b. Moreover, the common passages 24a, 25a, and 26a and the independent exhaust passages 14, 15, and 16 correspond to common passages connected to an exhaust opening.

Each of the high-speed passages 24b, 25b, and 26b has a cross-section shaped in an approximate rectangle. As illustrated in FIG. 4, the high-speed passages 24b, 25b, and 26b are formed to be transversely arranged in line. Similarly, each of the low-speed passages 24c, 25c, and 26c has a cross-section shaped in an approximate rectangle. The low-speed passages 24c, 25c, and 26c are formed above the high-speed passages 24b, 25b, and 26b to be transversely arranged in line.

Meanwhile, as illustrated in FIGS. 2 and 4, the EGR intermediate passage 28 is formed in the left end of the device body 21. This EGR intermediate passage 28 has a cross-section shaped in an approximate rectangle. The EGR intermediate passage 28 is located left below the high-speed passage 24b of the first upstream exhaust passage 24.

The exhaust variable valve 3 changes flow areas of the exhaust gas in the high-speed passages 24b, 25b, and 26b of the upstream exhaust passages 24, 25, and 26. This exhaust variable valve 3 includes: a valve body 31; a drive shaft 32 connected to the valve body 31; and a negative pressure actuator 4 rotating this drive shaft 32. The valve body 31 includes three butterfly valves 30 in total each provided in a corresponding one of the high-speed passages 24b, 25b, and 26b. The exhaust variable valve 3 causes the negative pressure actuator 4 to drive the butterfly valves 30 to rotate via the drive shaft 32, to simultaneously open and close the high-speed passages 24b, 25b, and 26b.

Specifically described here is a configuration of the exhaust variable valve 3. As illustrated in FIG. 4, the valve body 31 includes the three butterfly valves 30 transversely lined and connected to each other. The transversely lined high-speed passages 24b, 25b, and 26b have the centers of the cross-sections transversely communicating with each other. The valve body 31 is provided to transversely extend to cross the communicating centers of the cross-sections of the high-speed passages 24b, 25b, and 26b. The valve body 31 has transvers ends each having a support 311 integrally formed with the valve body 31. Each of supports 311 is rotatably supported about a shaft center X1 (see FIG. 5) with respect to the device body 21. As exposed to high temperature exhaust gas, the valve body 31 is made of a heat-resistant material.

Figure 5:
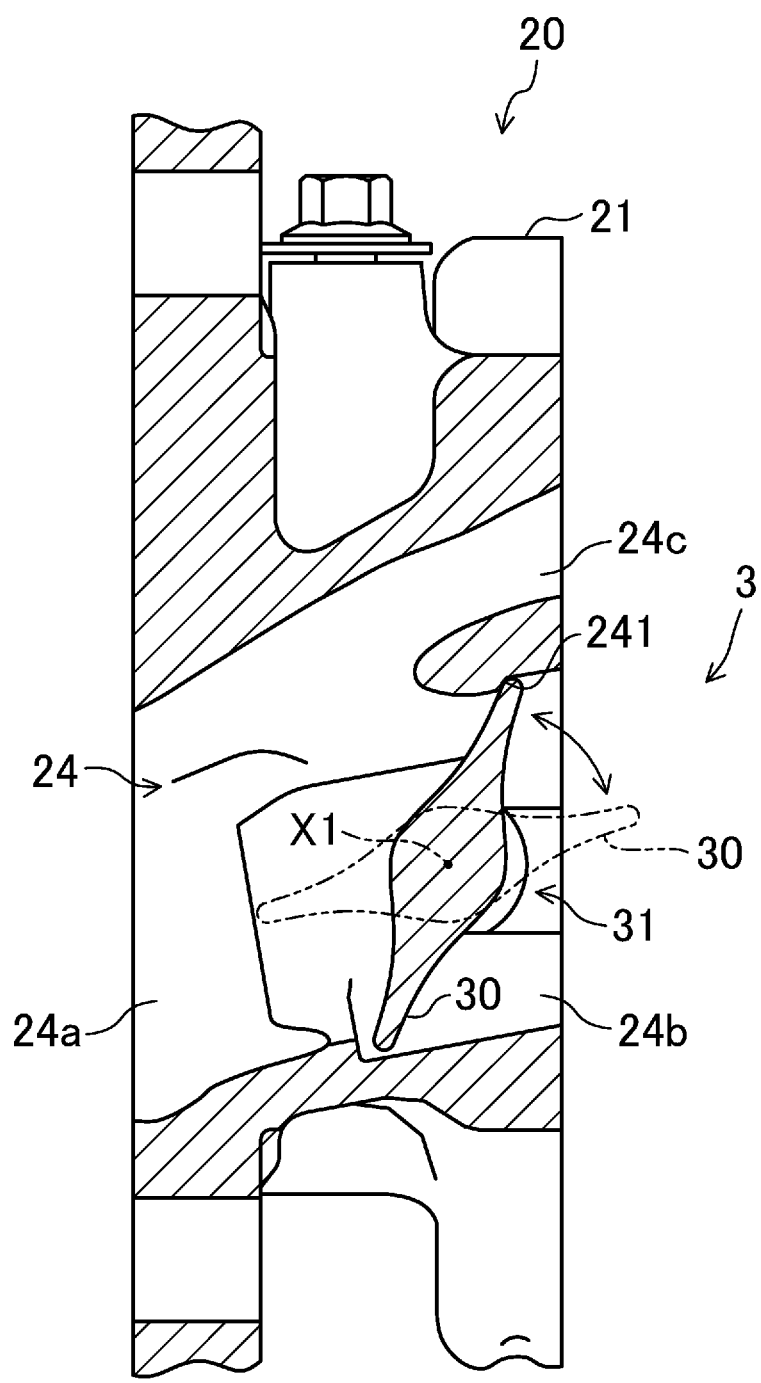
FIG. 5 is a cross-sectional view taken along line V-V in FIG. 3.

As illustrated in FIGS. 4 and 5, each of the butterfly valves 30 is shaped into a rectangular plate to fit the cross-section of a corresponding one of the high-speed passages 24b, 25b, and 26b. When a stopper engagement 47 of the negative pressure actuator 4 makes contact with a stopper 46 (see FIG. 6) as described later, each butterfly valve 30 closes the high-speed passages 24b, 25b, and 26b as illustrated in a solid line in FIG. 5. Then, when the negative pressure actuator 4 is driven and the stopper engagement 47 separates from the stopper 46, the valve body 31 rotates clockwise in FIG. 5. As illustrated in a two-dot chain line, each butterfly valve 30 opens the high-speed passages 24b, 25b, and 26b.

The drive shaft 32 is connected to the left end of the valve body 31. A detailed illustration of the connection shall be omitted. As illustrated in FIG. 4, the drive shaft 32 penetrates the device body 21 and extends out of the left of the upstream exhaust passages 24, 25, and 26. The drive shaft 32 has a tip end rotatably supported about the shaft center X1 by an auxiliary bearing 22 integrally provided to the device body 21. The auxiliary bearing 22 is located away from the upstream exhaust passages 24, 25, and 26 for a predetermined distance.

A lever 33 is secured to the tip end of the drive shaft 32 (specifically, to the tip end of the drive shaft 32 protruding to the left of the auxiliary bearing 22). A tip end of an output shaft 44 of the negative pressure actuator 4 is connected to the lever 33.

Figure 6:
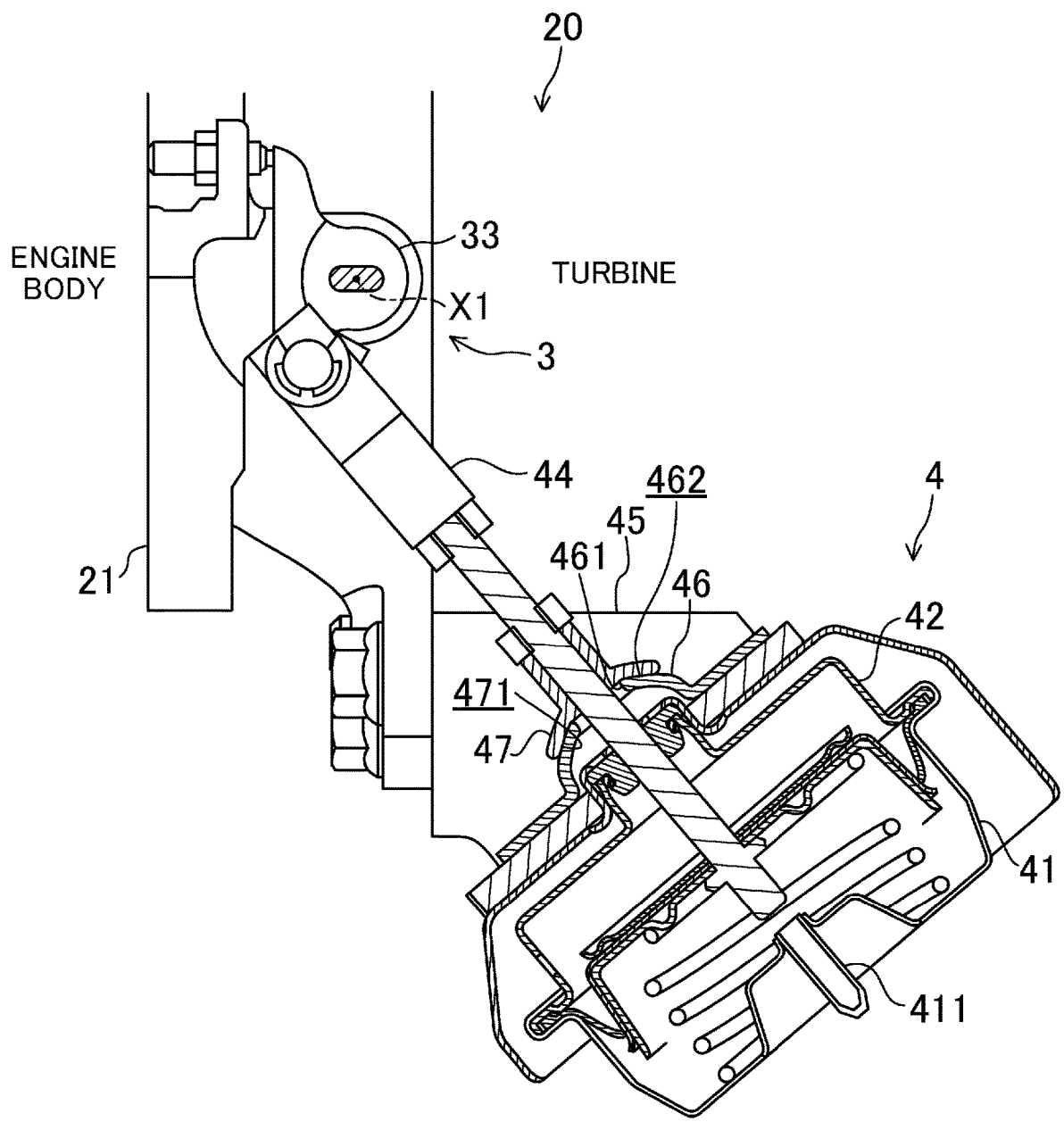
FIG. 6 is a cross-sectional view of a negative pressure actuator.

Meanwhile, as illustrated in FIGS. 4 and 6, the negative pressure actuator 4 is secured to the device body 21 via a bracket 45. The negative pressure actuator 4 causes the output shaft 44 to extend and retract with the supply and release of a negative pressure through a negative pressure pipe 411 connected to the bottom of the negative pressure actuator 4. With the extension and retraction of the output shaft 44, the lever 33 swings about the shaft center X1 of the drive shaft 32 and the drive shaft 32 rotates about the shaft center X1.

The stopper 46 is mounted on the bracket 45 of the negative pressure actuator 4. Note that, in this embodiment, the stopper 46 is mounted on the bracket 45 because the bracket 45 is provided in a path on which the output shaft 44 extends and retracts. Since the stopper 46 may be provided in any given position as long as provided in the path on which the output shaft 44 extends and retracts. For example, when the bracket 45 is provided in a position other than the path, the stopper 46 may directly be mounted on the body of the negative pressure actuator 4.

To the output shaft 44, the stopper engagement 47 is secured to engage with the stopper 46. When the output shaft 44 retracts, the stopper 46 and the stopper engagement 47 engage with each other to keep the output shaft 44 from retracting farther.

The stopper 46 is a member shaped into a hat. In the center of the stopper 46, a passing hole 461 is formed for the output shaft 44 to pass through. This passing hole 461 has a diameter sufficiently larger than that of the output shaft 44. The stopper 46 also has a first contact face 462 bulging in a convex, and provided in the center of the stopper 46 including the passing hole 461.

The stopper engagement 47 is secured to the center of the output shaft 44. The stopper engagement 47 has a second contact face 471 making contact with the first contact face 462 of the stopper 46. The second contact face 471 is shaped in a concave.

When the negative pressure is supplied to the negative pressure actuator 4 (i.e., when the negative pressure actuator 4 turns ON), the output shaft 44 retracts. As illustrated in FIG. 6, the stopper 46 and the stopper engagement 47 engage with each other. Hence, as illustrated in the solid line in FIG. 5, the butterfly valves 30 close the high-speed passages 24b, 25b, and 26b. Meanwhile, when the negative pressure is released from the negative pressure actuator 4 (i.e., when the negative pressure actuator 4 turns OFF), the output shaft 44 extends. Hence, as illustrated in the two-dot chain line in FIG. 5, the butterfly valves 30 open the high-speed passages 24b, 25b, and 26b. The exhaust variable valve 3 is normally open.

As illustrated in FIGS. 2 and 3, the turbocharger 50 is bolted on the device body 21 of the exhaust valve device 20. The turbocharger 50 includes: the exhaust introduction passage 51 secured to a mounting surface 21a (see FIG. 4) of the device body 21; a turbine housing 560 continuing to the exhaust introduction passage 51; the turbine 56 housed in this turbine housing 560; and the compressor 55 provided in the intake passage 52 not shown in FIG. 2.

The exhaust introduction passage 51 includes: (i) an independent high-speed passage 51b communicating with each of the high-speed passages 24b, 25b, and 26b of the exhaust valve device 20; and (ii) and an independent low-speed passage 51c communicating with each of the low-speed passages 24c, 25c, and 26c of the exhaust valve device 20. In the high-speed passage 51b of the exhaust introduction passage 51, the three high-speed passages 24b, 25b, and 26b independent in the exhaust valve device 20 join together. Details of this configuration shall be omitted. Similarly, in the low-speed passage 51c of the exhaust introduction passage 51, the three low-speed passages 24c, 25c, and 26c independent in the exhaust valve device 20 join together.

The exhaust introduction passage 51 has a downstream end provided with the collector 54. In the collector 54, the high-speed passage 51b and the low-speed passage 51c join together. Flows of the exhaust gas from the high-speed passage 51b and the low-speed passage 51c in a downstream exhaust passage join together in this collector 54, and are sent to the turbine 56.

As described before, this engine 1 does not include an independent component as the exhaust manifold. Instead, a combination of the following constituent elements implements the exhaust manifold: (i) the independent exhaust passages 14, 15, and 16 of the engine 1 (the cylinder head 10); (ii) the upstream exhaust passages 24, 25, and 26 of the exhaust valve device 20; (iii) the exhaust introduction passage 51 of the turbocharger 50; and (□) the collector 54.

Moreover, on the left of the exhaust introduction passage 51 in the turbine housing 560, an EGR upstream passage 58 is formed to communicate with the EGR intermediate passage 28 of the exhaust valve device 20. A portion of the exhaust gas flowing into the turbocharger 50 is to be introduced as EGR gas into the intake passage 52 via the EGR upstream passage 58, the EGR intermediate passage 28, and the EGR downstream passage 18. Specifically, in this engine 1, the EGR downstream passage 18, the EGR intermediate passage 28, and the EGR upstream passage 58 define an EGR passage.

The exhaust gas produced in the engine 1 is introduced from the independent exhaust passages 14, 15, and 16, through the upstream exhaust passages 24, 25, and 26 of the exhaust valve device 20 into the turbocharger 50. Here, depending on a driving state of the car, the engine controller 7 changes a flow area of the exhaust gas flowing through the high-speed passages 24*b*, 25*b*, and 26*b* of the exhaust valve device 20.

Figure 8:
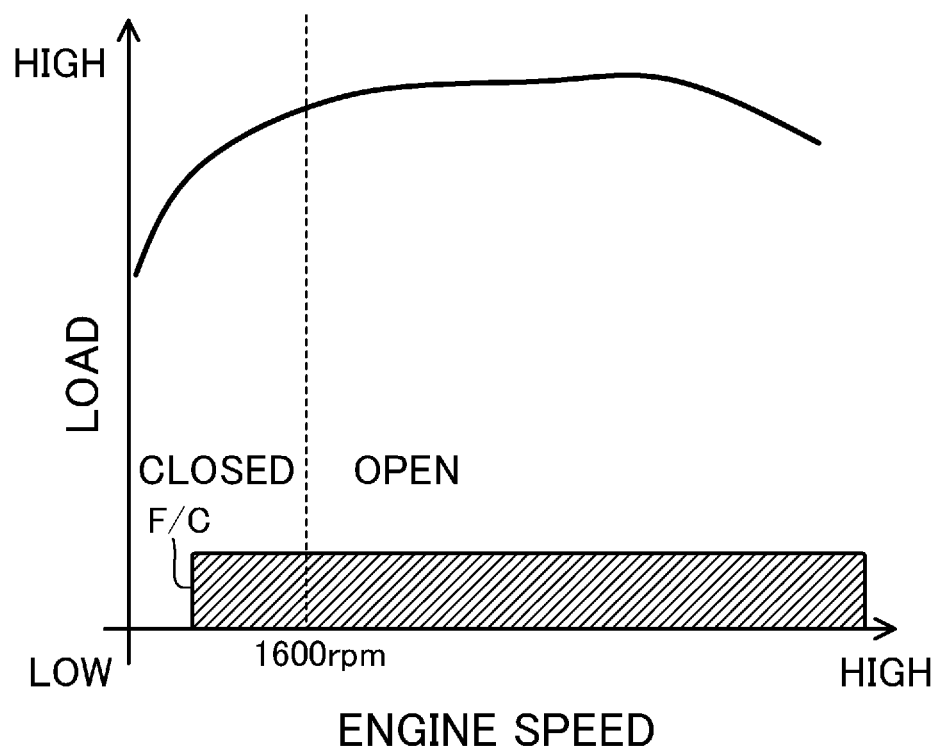
FIG. 8 is a graph illustrating, as an example, a control map for opening and closing of an exhaust variable valve.

Specifically, as illustrated in FIG. 8, when an engine speed of the engine 1 is in a low speed range lower than a predetermined engine speed (e.g., 1,600 rpm), the engine controller 7 causes the exhaust valve device 20 to close the high-speed passage 24*b*, 25*b*, and 26*b*. In other words, as the solid line in FIG. 5 shows, the butterfly valves 30 close the exhaust variable valve 3 to close the high-speed passages 24*b*, 25*b*, and 26*b*. Such a feature allows a little exhaust gas to be concentrated in the low-speed passages 24*c*, 25*c*, and 26*c* to increase the flow rate of the exhaust gas, raising the driving force of the turbine 56 in the turbocharger 50 and boosting intake air pressure. Furthermore, in the low speed range, the ejector effect is achieved in the downstream low-speed passage 51*c* in which the upstream low-speed passages 24*c*, 25*c*, and 26*c* join together. The ejector effect makes it possible to suck the burned gas in the cylinders 2A to 2D to achieve a scavenging effect.

Meanwhile, if the exhaust gas flows only through the low-speed passages 24*c*, 25*c*, and 26*c* when the engine speed of the engine 1 is in a high speed range higher than or equal to a predetermined engine speed, the backpressure could cause a potential reduction in scavenging performance. Hence, the engine controller 7 causes the exhaust valve device 20 to open the high-speed passages 24*b*, 25*b*, and 26*b*. In other words, as the two-dot chain line in FIG. 5 shows, the butterfly valves 30 open the exhaust variable valve 3 to open the high-speed passages 24*b*, 25*b*, and 26*b*. The exhaust gas is introduced into the turbocharger 50 via both the high-speed passages 24*b*, 25*b*, and 26, and the low-speed passages 24*c*, 25*c*, and 26*c*. Such a feature drives the turbocharger 50 to boost the intake air pressure while curbing the reduction in scavenging performance caused by the backpressure in the exhaust passages. The exhaust variable valve 3 switches between a fully open position and a fully closed position once the engine 1 reaches a predetermined engine speed. Thus, the opening and closing operations of the exhaust variable valve 3 need to be highly responsive.

(Controlling Engine)

FIG. 7 is a block diagram illustrating a configuration of the engine system. The engine system includes the engine controller 7. The airflow sensor 520, the $O_2$ sensors 83 and 84, and the crank angle sensor 211 are connected to the engine controller 7. Moreover, a water temperature sensor 210, an accelerator angle sensor 212, a gear-speed detector 215, and a car-speed sensor 214 are also connected to the engine controller 7. The water temperature sensor 210 is secured to a coolant passage of the engine 1 and detects a coolant temperature. The accelerator angle sensor 212 detects an accelerator angle. The gear-speed detector 215 detects a gear speed in which the transmission is operating. The car-speed sensor 214 detects a speed of the car running. In accordance with a target acceleration of the car set based on the results detected by devices such as these sensors, the engine controller 7 sets a target torque of the engine 1. In order to achieve the set target torque of the engine 1, the engine controller 7 outputs a control signal to the fuel injection valve 41, the spark plug 42, the intake valve train mechanism 310, the exhaust valve train mechanism 330, the throttle valve 511, and the exhaust variable valve 3. The engine controller 7 includes a valve controller to control an opening of the butterfly valves 30.

The engine controller 7 also performs fuel cut control which involves suspending supply of the fuel to the engine 1 if a preset fuel cut condition is met when the car slows down. The engine controller 7 includes a fuel injection valve controller which performs the fuel cut control that involves keeping the fuel from being injected from the fuel injection valve 41 if a predetermined condition is met. The fuel cut condition includes cases when (i) an accelerator pedal is not depressed and the accelerator angle is zero, (ii) the engine speed of the engine 1 is a predetermined engine speed or higher, and (iii) a torque of the engine 1 decreases to a predetermined torque.

Here, the predetermined engine speed is equivalent to an engine speed of the engine 1 returning from the fuel cut control (i.e., resuming the supply of the fuel) to keep from stalling. The predetermined engine speed is slightly higher than an idling engine speed. When the idling engine speed is 750 rpm, for example, the predetermined engine speed may be approximately 1,000 rpm. The predetermined engine speed can be set as appropriate. Moreover, with the predetermined torque, the fuel cut control starts while no torque shock is generated. The predetermined torque can be set as appropriate.

A range in which the fuel cut control is performed includes a range in which the exhaust variable valve 3 is closed as F/C in FIG. 8 shows.

Even though the butterfly valves 30 are closed, the stopper engagement 47 and the stopper 46 make contact with each other to reduce flip-flops of the butterfly valves 30, when the butterfly valves 30 receive the fluid pressure alone caused by the gas flowing in the exhaust passages from an exhaust opening toward the turbine housing 560. Whereas during the fuel cut control, the opening of the throttle valve 511 is small and the fuel in the combustion chamber 200 does not combust. Hence, when the cylinder 2 finishes the expansion stroke with no fuel combusted, the pressure in the cylinder 2 is lower than that in the intake passage 52 and the exhaust passage 53. Thus, when the exhaust valve 303 opens in an initial stage of the exhaust stroke, the gas in the exhaust passageway 53 flows back into the cylinder 2 via the exhaust opening. Meanwhile, as the exhaust stroke proceeds and the piston 27 rises, the gas in the cylinder 2 is forced out toward the exhaust passageway 53. Here, if the butterfly valves 30 close the high-speed passages 24*b*, 25*b*, and 26*b*, the butterfly valves 30 alternately receive a fluid pressure created when the gas in the exhaust passage 53 flows back into the cylinder 2 and a fluid pressure created when the gas in the cylinder 2 is forced out toward the exhaust passage 53. As a result, the butterfly valves 30 alternately receive the force applied in a direction to increase the contact between the stopper engagement 47 and the stopper 46, and the force applied in a direction to decrease the contact. Hence, the butterfly valves 30 (i.e., the valve body 31) pivot about the drive shaft 32 and flip-flop. This is a potential cause of noise and reduction in durability of the butterfly valves 30.

Figure 9:
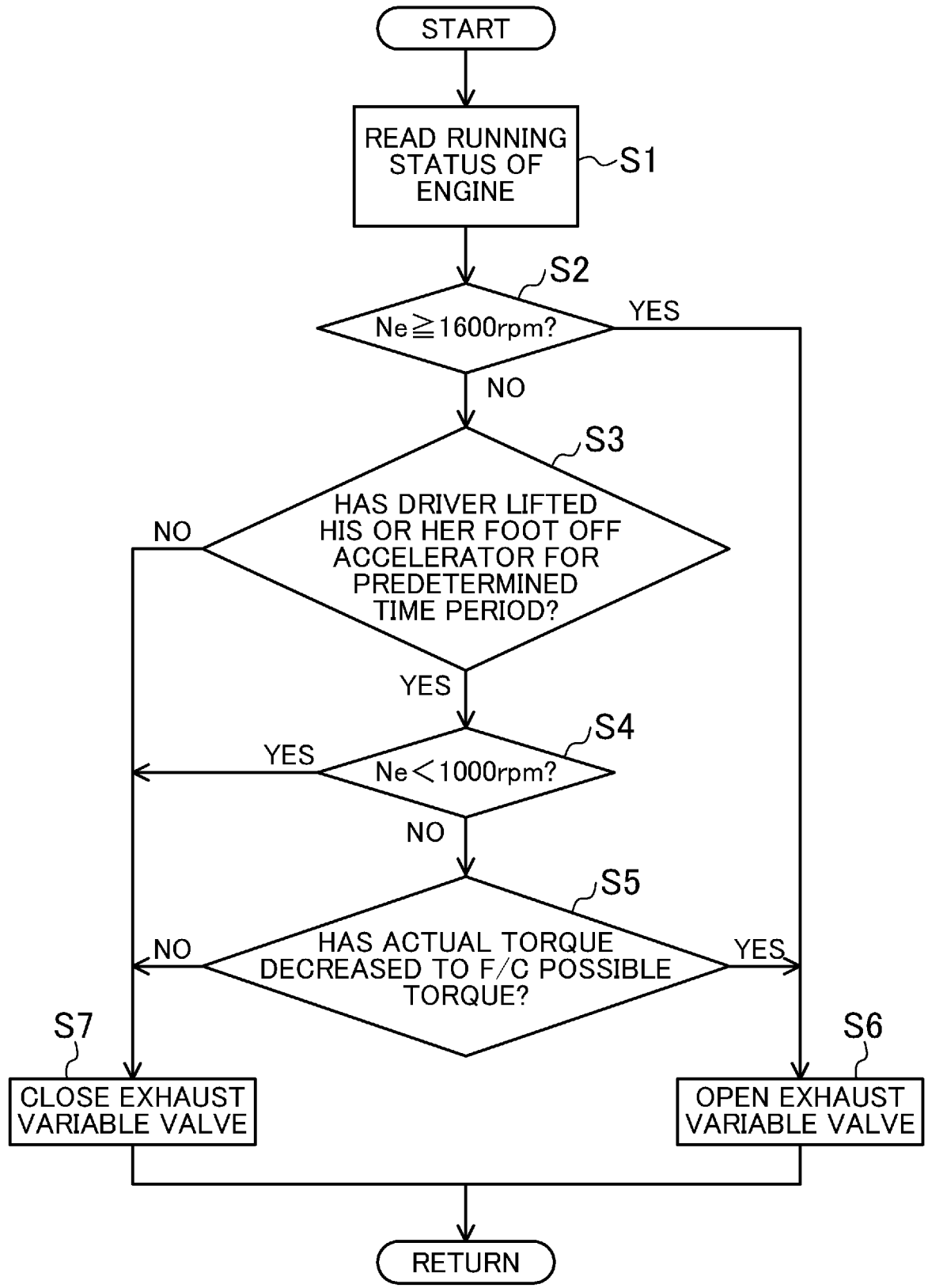
FIG. 9 is a flowchart illustrating control for the opening and closing of the exhaust variable valve.

Hence, in this engine system, the exhaust variable valve 3 opens during the fuel cut control. Hereinafter, open-close control of this exhaust variable valve 3 is specifically described with reference to the flowchart illustrated in FIG. 9. The flowchart illustrated in FIG. 9 corresponds to a flow while the car is slowing down. In parallel with this flowchart, the engine controller 7 performs controls of the start of, and the return from, the fuel cut.

First, in Step S1 after the start of the engine 1, the engine controller 7 reads a running status of the engine 1. Specifically, the engine controller 7 reads an engine speed and an actual torque of the engine 1. The engine speed is detected based on a detecting signal of the crank angle sensor 211. In this example, the actual torque of the engine 1 is estimated based on an amount of mass air to be introduced into the cylinder 2 and ignition timing of the spark plug 42. Here, the amount of mass air is calculated from an amount and a temperature of intake air detected by the airflow sensor 520. Moreover, the engine controller 7 may estimate the engine torque based on the amount of the fuel to be injected and the ignition timing, instead of the amount of mass air.

In succeeding Step S2, the engine controller 7 determines whether an engine speed Ne is 1,600 rpm or higher. As illustrated in FIG. 8, the engine speed of 1,600 rpm is a boundary value between opening and closing of the exhaust variable valve 3. If the engine speed is 1,600 rpm or higher, the engine controller 7 determines that the engine speed of the engine 1 is in the high speed range. The process then proceeds to Step S6, and the engine controller 7 opens the exhaust variable valve 3.

Meanwhile, if the engine speed is lower than 1,600 rpm, the process proceeds to Step S3. In Step S3, the engine controller 7 determines whether the driver has lifted his or her foot off the accelerator for a predetermined time period. If the determination is NO, the process then proceeds to Step S7. In Step S7, the engine speed of the engine 1 is in the low speed range. The engine controller 7 closes the exhaust variable valve 3.

In Step S4, the engine controller 7 determines whether the engine speed Ne of the engine 1 is lower than 1,000 rpm. At the engine speed of 1,000 rpm, the engine 1 returns from the fuel cut control. When the determination is YES, the engine controller 7 does not cut the fuel. The process then proceeds to Step S7, and the engine controller 7 closes the exhaust variable valve 3. Meanwhile, if the determination is NO, the process proceeds to Step S5.

In Step S5, the engine controller 7 determines whether the actual torque of the engine 1 has decreased to a fuel-cut (F/C) possible torque with no torque shock generated even though the fuel cut control starts. The F/C possible torque is determined based on values detected by the accelerator angle sensor 212, the car-speed sensor 214, and the gear-speed detector 215 for the transmission. When the determination is NO, the engine controller 7 does not start the fuel cut control. The process then proceeds to Step S7, and the engine controller 7 closes the exhaust variable valve 3. Meanwhile, when the determination is YES, the engine controller 7 starts the fuel cut control. Hence, the process proceeds to Step S6, and the engine controller 7 opens the exhaust variable valve 3. As described before, the engine controller 7 determines whether to start the fuel cut, apart from this flow. How to determine whether to start the fuel cut is substantially the same as Steps S2 to S5 in the flow illustrated in FIG. 9. Thus, the engine controller 7 substantially simultaneously starts the fuel cut by causing the fuel injection valve 41 to suspend the injection of the fuel and opens the exhaust variable valve 3.

Figure 10:
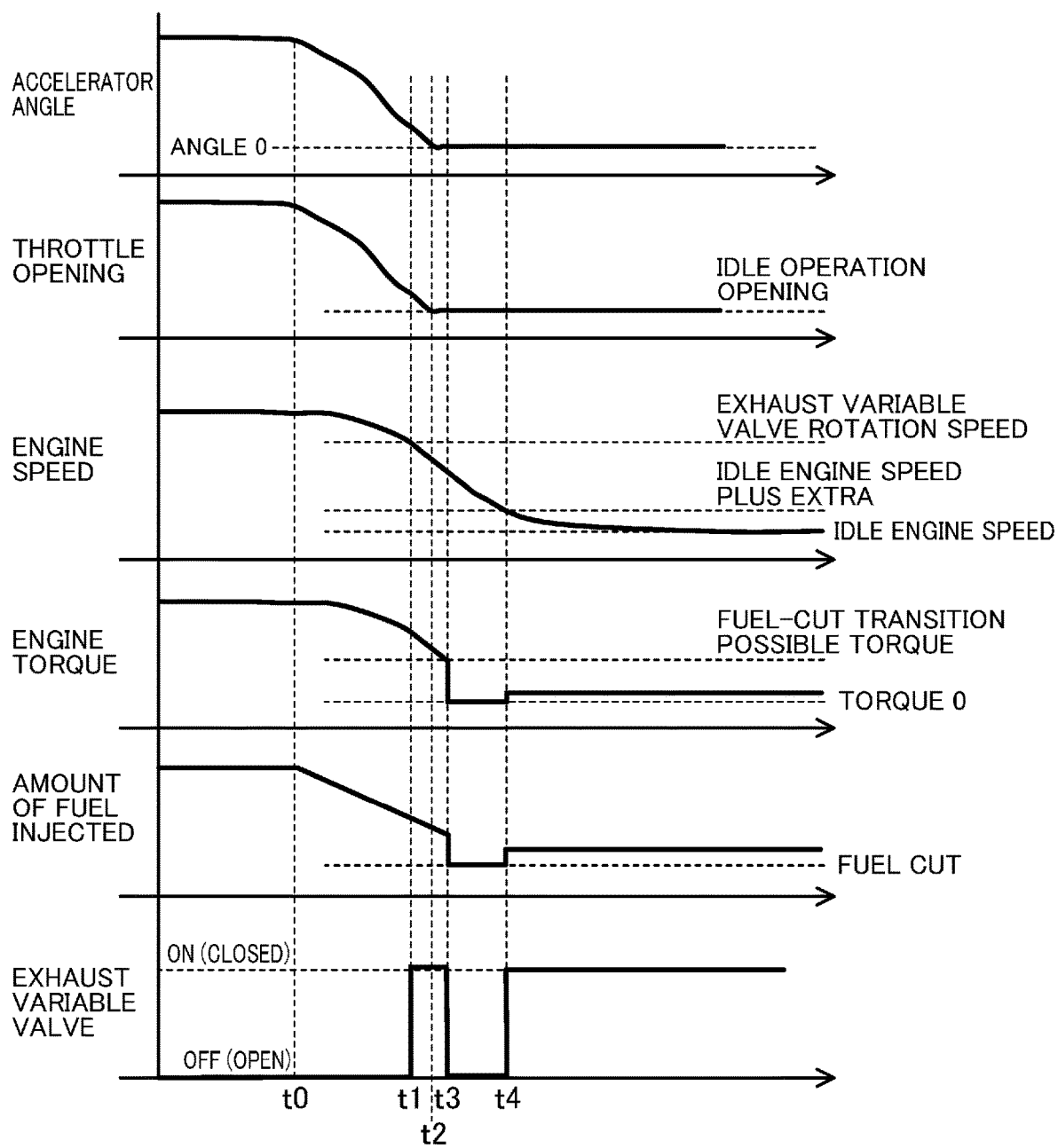
FIG. 10 is a timing diagram illustrating, as an example, variations in accelerator angle, throttle opening, engine speed, engine torque, amount of fuel injected, and opening and closing states of the exhaust variable valve from a running state with the exhaust variable valve open to a fuel cut control.

FIG. 10 is a timing diagram illustrating variations in accelerator angle, throttle opening, engine speed, engine torque, amount of fuel to be injected, and opening and closing of the exhaust variable valve 3 when the car slows down. First at a time t0, suppose the car starts to slow down with the exhaust variable valve 3 open and the driver gradually lifting his or her foot off the accelerator. With the accelerator angle decreasing, the throttle opening decreases. In response to this, the amount of fuel to be injected also decreases. Then, both the engine speed and the engine torque decrease.

At a time t1, suppose the engine speed decreases to a speed (here, 1,600 rpm as described above) to close the exhaust variable valve 3. Hence, the opened exhaust variable valve 3 is closed.

At a time t2, suppose the accelerator angle becomes zero, and this state continues from then on. The throttle opening is maintained to an idle operation opening. The engine speed and the engine torque gradually decrease.

At a time t3, suppose the engine torque reaches a fuel-cut transition possible torque. In response to this, the supply of the fuel is suspended. Moreover, in accordance with the flowchart illustrated in FIG. 9, the closed exhaust variable valve 3 is opened again.

At a time t4, suppose the engine speed, which has gradually decreased during the fuel cut, reaches a predetermined engine speed (i.e., an idle engine speed plus extra). In response to this, the injection of the fuel is resumed, and the opened exhaust variable valve 3 is closed.

As described above, the exhaust device 100 of the engine 1 opens the exhaust variable valve 3 to open the high-speed passages 24b, 25b, and 26b, even though the engine speed of the engine 1 is lower than the predetermined engine speed when the engine 1 performs the fuel cut control. Such a feature reduces the risk that the fluid pressure acts on the butterfly valves 30, even if the gas in the exhaust passage 53 flows back into the cylinder 2 and the gas in the cylinder 2 is forced out toward the exhaust passage 53 with the opening and closing of the exhaust valve 303. As a result, flip-flop of the valve body 31 during the fuel cut can be reduced.

Moreover, the engine controller 7 opens the exhaust variable valve 3 simultaneously when the fuel cut starts, not after the fuel cut has started. Such a feature makes it possible to immediately open the exhaust variable valve 3. As a result, the flip-flop of the valve body 31 can be reliably reduced, reducing generation of noise.

Furthermore, the engine controller 7 opens the exhaust variable valve 3 if detecting a state in which the accelerator angle of zero continues for a predetermined time period. Thus, if the accelerator angle becomes temporarily zero, the exhaust variable valve 3 does not open. The exhaust variable valve 3 is kept from opening when the driver releases the accelerator pedal for a moment and then soon depresses the pedal again. As a result, the driver can run the car smoothly.

Note that the engine of the embodiment described above is an example of a preferable embodiment of the exhaust device 100 of the engine 1. A specific configuration of the engine and the exhaust valve device 20 included in this engine can be changed as appropriate unless otherwise departing from the scope of the present invention.

Furthermore, in this embodiment, the exhaust device 100 is adopted to an inline-four four-cycle engine. As a matter of course, the exhaust device 100 disclosed here can also be adopted to an engine other than the one in this embodiment.

DESCRIPTION OF REFERENCE CHARACTERS

1 Engine
100 Exhaust Device

212 Accelerator Angle Sensor (Accelerator Angle Detector)
24a Common Passage
24b, 25b, 26b High-Speed Passage (First Passage)
24c, 25c, 26c Low-Speed Passage (Second Passage)
3 Exhaust Variable Valve
30 Butterfly Valve (Valve)
31 Valve Body
32 Drive Shaft
41 Fuel Injection Valve
50 Turbocharger
53 Exhaust Passage
54 Collector
56 Turbine
560 Turbine Housing
7 Engine Controller (Valve Controller, Fuel Injection Valve Controller, Torque Estimator)

The invention claimed is:

1. An engine system comprising:
an exhaust passage connecting an exhaust opening of a combustion chamber within an engine to an exhaust gas purifier outside the engine,
wherein the engine system includes:
an engine controller,
a fuel injection valve supplying the combustion chamber with fuel, and
wherein the engine controller is configured to perform a fuel cut control which involves keeping the fuel from being injected from the fuel injection valve when a predetermined condition is met while a car is running,
the exhaust passage includes: a common passage connected to the exhaust opening; a first passage and a second passage branching off downstream in the common passage and provided in parallel with each other; and a collector, provided downstream of the first passage and the second passage, in which the first passage and the second passage join together,
the collector of the first passage and the second passage is connected to a turbine housing of a turbocharger including a turbine,
a valve shaped as a plate is provided in the first passage to change a cross-sectional area of the first passage when a drive shaft connected to the valve pivots,
wherein the engine controller is configured to
(i) close the valve to close the first passage if an engine speed of the engine is lower than a predetermined engine speed, and
(ii) open the valve to open the first passage if the engine speed of the engine is higher than or equal to the predetermined engine speed, and
the engine controller opens the valve even though the engine speed of the engine is lower than the predetermined engine speed if the engine controller performs the fuel cut control.

2. The engine exhaust device of claim 1, further comprising:
an accelerator angle detector detecting an accelerator angle; and
the engine controller is configured to estimate an actual torque of the engine, wherein
the engine controller opens the valve even though the engine speed of the engine is lower than the predetermined engine speed if the accelerator angle detector detects that the accelerator angle is zero and the engine controller estimates that the actual torque of the engine is lower than or equal to a predetermined value.

3. The engine exhaust device of claim 2, wherein
the engine controller opens the valve if the accelerator angle detector detects a state in which the accelerator angle is continuously zero for a predetermined time period.

* * * * *